(12) United States Patent
VanSteenwyk

(10) Patent No.: US 10,047,600 B2
(45) Date of Patent: *Aug. 14, 2018

(54) ATTITUDE REFERENCE FOR TIEBACK/OVERLAP PROCESSING

(71) Applicant: Scientific Drilling International, Inc., Houston, TX (US)

(72) Inventor: Brett VanSteenwyk, San Luis Obispo, CA (US)

(73) Assignee: SCIENTIFIC DRILLING INTERNATIONAL, INC., Houston, TX (US)

(*) Notice: Subject to any disclaimer, the term of this patent is extended or adjusted under 35 U.S.C. 154(b) by 171 days.

This patent is subject to a terminal disclaimer.

(21) Appl. No.: 15/044,813

(22) Filed: Feb. 16, 2016

(65) Prior Publication Data

US 2016/0245070 A1    Aug. 25, 2016

Related U.S. Application Data

(63) Continuation of application No. 14/052,000, filed on Oct. 11, 2013, now Pat. No. 9,291,047.

(Continued)

(51) Int. Cl.
*E21B 44/00* (2006.01)
*E21B 47/024* (2006.01)
(Continued)

(52) U.S. Cl.
CPC .............. *E21B 47/024* (2013.01); *E21B 7/04* (2013.01); *E21B 44/00* (2013.01);
(Continued)

(58) Field of Classification Search
CPC .......... E21B 47/024; E21B 7/04; E21B 44/00; E21B 47/02216
See application file for complete search history.

(56) References Cited

U.S. PATENT DOCUMENTS 5,321,893 A    6/1994  Engebretson
6,315,062 B1   11/2001 Alft et al.
(Continued)

FOREIGN PATENT DOCUMENTS

EP    2653648 A2    10/2013
RU    2102596 C1     1/1998
(Continued)

OTHER PUBLICATIONS

Extended European Search Report issued in EP 13844704.0, dated Aug. 2, 2016, 10 pages.
(Continued)

*Primary Examiner* — Taras P Bemko
(74) *Attorney, Agent, or Firm* — Adolph Locklar

(57) ABSTRACT

A method for calculating orientation changes within a borehole using a gyro sensor to detect angular deflection rates in an attitude reference interval as a MWD system is moved from a first to a second location within the borehole. A compass shot may be taken at one or more of the first and second locations using a magnetometer and accelerometer or gyro sensor and accelerometer. Tieback and/or overlap processing may be applied to increase the accuracy of measured orientation within the borehole. Additionally, tieback and/or overlap processing may be applied to adjust sensor model parameters in response to discrepancies between calculated and measured locations. Iterated calculations of orientation change between subsequent intervals may allow MWD orientation to be computed for an entire drilling operation using only a single compass shot.

26 Claims, 5 Drawing Sheets

Related U.S. Application Data

(60) Provisional application No. 61/713,164, filed on Oct. 12, 2012.

(51) Int. Cl.
  *E21B 7/04* (2006.01)
  *E21B 47/022* (2012.01)
  *G01C 5/00* (2006.01)
  *G01V 3/08* (2006.01)
  *G01V 9/00* (2006.01)

(52) U.S. Cl.
  CPC .......... *E21B 47/02216* (2013.01); *G01C 5/00* (2013.01); *G01V 3/081* (2013.01); *G01V 9/00* (2013.01)

(56) References Cited

U.S. PATENT DOCUMENTS

| | | |
|---|---|---|
| 2003/0041661 A1 | 3/2003 | Van Steenwyk et al. |
| 2003/0236627 A1 | 12/2003 | Estes |
| 2005/0022402 A1 | 2/2005 | Ash et al. |
| 2008/0314137 A1 | 12/2008 | Proett et al. |
| 2010/0198518 A1 | 8/2010 | Ekseth et al. |
| 2012/0095685 A1 | 4/2012 | Ekseth et al. |
| 2012/0247833 A1 | 10/2012 | Ekseth et al. |
| 2012/0255780 A1 | 10/2012 | Schmidt |
| 2013/0282290 A1 | 10/2013 | Weston et al. |

FOREIGN PATENT DOCUMENTS

| | | |
|---|---|---|
| RU | 2253838 C2 | 6/2005 |
| SU | 1356969 A3 | 11/1987 |
| SU | 1377377 A1 | 2/1988 |
| WO | 9411762 A1 | 5/1994 |
| WO | 2010128959 A1 | 11/2010 |

OTHER PUBLICATIONS

Office Action issued in Russian Application No. 2015117646, dated Aug. 18, 2017, 19 pages.

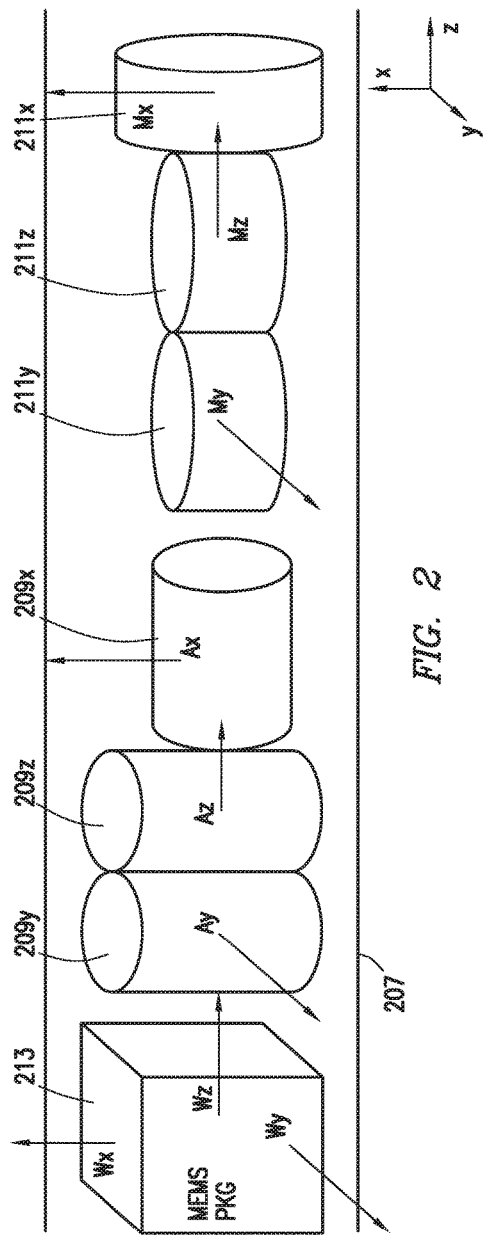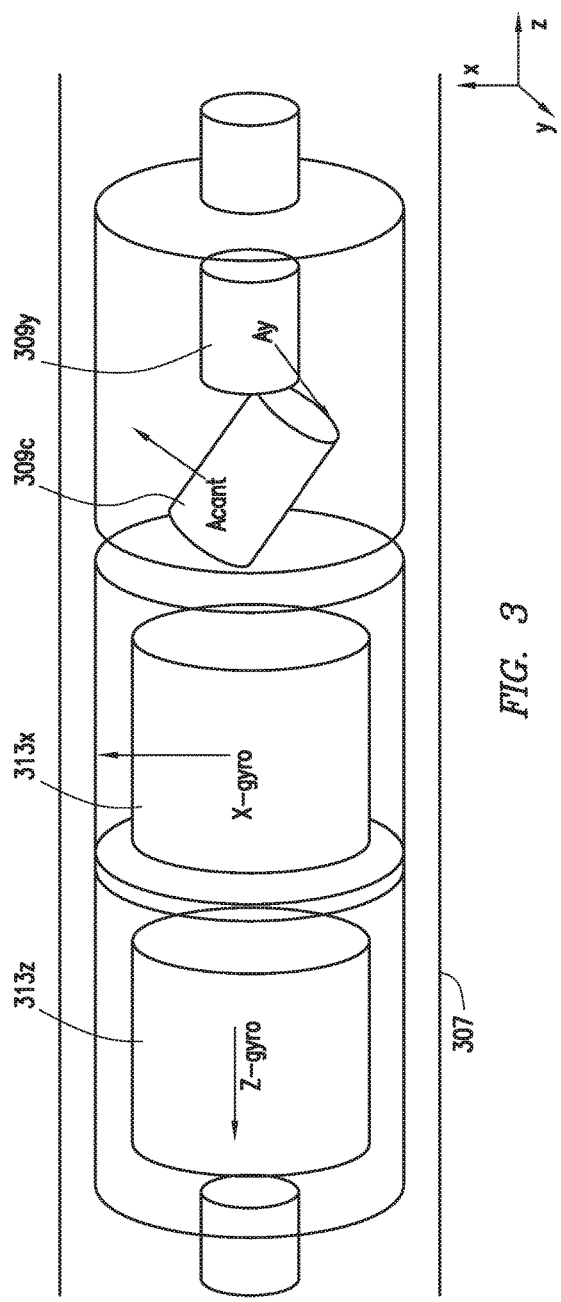

US 10,047,600 B2

ATTITUDE REFERENCE FOR TIEBACK/OVERLAP PROCESSING

CROSS-REFERENCE TO RELATED APPLICATIONS

This application is a continuation application of U.S. application Ser. No. 14/052,000, filed on Oct. 11, 2013 and now issued as U.S. Pat. No. 9,291,047, which is itself a non-provisional application which claims priority from U.S. provisional application No. 61/713,164, filed Oct. 12, 2012.

TECHNICAL FIELD/FIELD OF THE DISCLOSURE

The present disclosure relates to surveys in a measurement while drilling (MWD) system, and more particularly to processing methods for data collected by MWD sensors.

BACKGROUND OF THE DISCLOSURE

Accurately and precisely determining the position and orientation of a drilling assembly during drilling operations is desirable, particularly when drilling deviated wells. Traditionally, a combination of sensors is used to measure downhole trajectory and subterranean conditions. Data collected in this fashion is usually transmitted to the surface via MWD-telemetry known in the art so as to communicate this trajectory information to the surface. Many factors may combine to unpredictably influence the trajectory of a drilled borehole. Accurate determination of the borehole trajectory is necessary to determine the position of the borehole and to guide the borehole to its geological objective as well as avoiding collisions with underground objects, geological features, wells, or zones. In other cases, it is desired to intercept underground objects, geological features, wells, or zones.

In some instances, surveying of a borehole using conventional methods involves the periodic measurement of the Earth's magnetic and gravitational fields to determine the azimuth and inclination of the borehole at the bottom hole assembly. Historically, this determination has been made while the bottom hole assembly is stationary. Consequently, the along-hole depth or borehole distance between discrete survey stations is generally from 30 to 60 to 90 feet or more, corresponding to the length of joints or stands of drillpipe added at the surface. Error accumulated between multiple survey stations caused by, for example, the presence of physical factors or anomalies may skew measurement accuracy. For example, MWD systems which rely on magnetometers may be influenced by magnetic interference both on and off the drill string. Additionally, gyrocompasses naturally tend to lose accuracy at higher inclinations which may reduce overall survey accuracy in gyrocompass MWD systems.

SUMMARY

The present disclosure provides for a method for computing the orientation of a MWD system in a borehole. The method may include providing a MWD system, the MWD system including multiple sensors, the data collected by the sensors interpreted by sensor models having adjustable sensor model parameters, the MWD system having an orientation, the orientation including azimuth and inclination. The method may further include positioning the MWD system on a drill string. The method may further include positioning the drill string at a depth within a borehole drilled from a surface location, the depth measured from the location of the MWD system to the surface location, the direction of the borehole generally being represented by the orientation of the MWD system; moving, by a motion of the drill string, the location of the MWD system within the borehole from a first depth to a second depth; sensing changes in the orientation of the MWD system using one or more sensors of the multiple sensors as the MWD system is moved from the first depth to the second depth; and calculating the change in orientation of the MWD system between the first and second depths.

The present disclosure also provides for a method for computing the orientation of a MWD system in a borehole. The method may include providing a MWD system, the MWD system including multiple sensors, the data collected by the sensors interpreted by sensor models having adjustable sensor model parameters, the MWD system having an orientation, the orientation including azimuth and inclination. The method may further include positioning the MWD system on a drill string. The method may further include positioning the drill string at an upper depth within a borehole drilled from a surface location into an earthen formation, the depth measured from the location of the MWD system to the surface location, the direction of the borehole in which the MWD system generally being represented by the orientation of the MWD system; taking a compass shot using two or more sensors of the multiple sensors at the upper depth to determine the orientation of the MWD system at the upper depth; drilling deeper into the earthen formation, the MWD system thus moved to a lower depth; moving, by a motion of the drill string, the MWD system within the borehole either from the upper depth to the lower depth or from the lower depth to the upper depth; sensing changes in the orientation of the MWD system using one or more sensors of the multiple sensors as the MWD system is moved; calculating the change in orientation of the MWD system between the upper and lower depths; and computing the orientation of the MWD system at the lower depth using the calculated change in orientation between the upper and lower depths and the orientation of the MWD system at the upper depth.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 depicts a block diagram of the sensors of a MWD system consistent with embodiments of the present disclosure.

FIG. 3 depicts an alternate block diagram of the sensors of a MWD system consistent with embodiments of the present disclosure.

DETAILED DESCRIPTION

Figure 1:
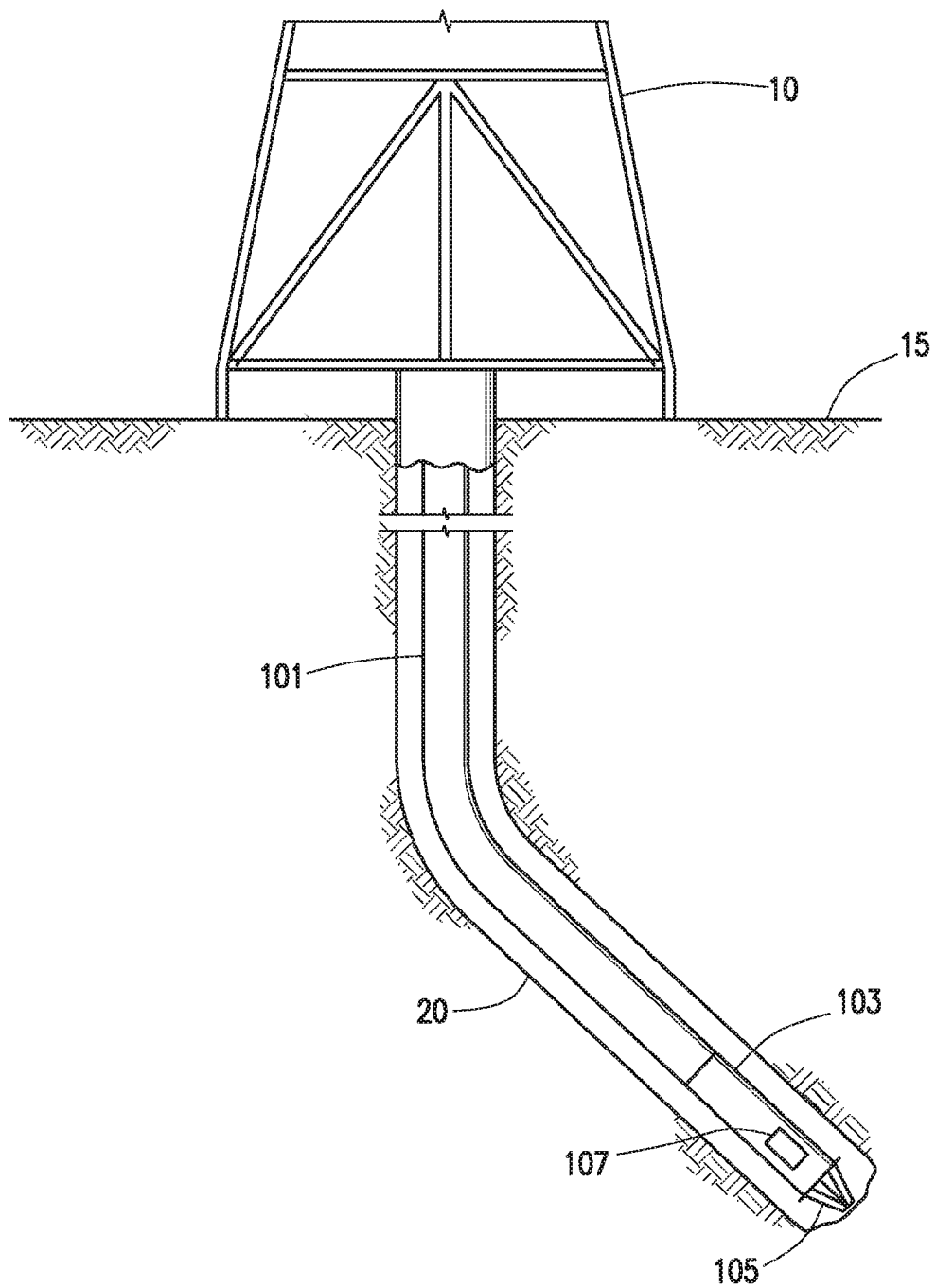
FIG. 1 depicts a drilling operation including a MWD system consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts the drilling of a deviated borehole with a drill string carrying a measurement while drilling (MWD) system. More particularly, drilling rig 10 at surface 15 is shown drilling borehole 20. Drill string 101 is made up of numerous sections of pipe and includes bottom hole assembly 103 and drill bit 105. As understood in the art, the sections of pipe are threadedly connected and are connected to the top of drill string 101 at drilling rig 10 as borehole 20 is drilled to increase the length of drill string 101. The pipe sections are often added as two or three pre-connected tubular sections known as a pipe stand. In an exemplary case, pipe sections may be approximately 30 feet in length, and pipe stands may be between 60 and 90 feet in length.

MWD system 107 may be included in drill string 101. In some embodiments, such as that depicted in FIG. 1, MWD system 107 may be located as a part of bottom hole assembly 103. In other embodiments, MWD system 107 may be positioned in a different location along drill string 101.

As depicted in FIG. 2 an exemplary MWD system 207 is depicted as a block diagram. MWD system 207 may include accelerometers 209x, 209y, 209z each positioned to measure acceleration in mutually orthogonal axes (x, y, z). In particular, the outputs of accelerometers 209x, 209y, and 209z may be used to determine the Earth's gravitational force vector relative to MWD system 207. In some embodiments, one of the axes (here depicted as z) may be aligned with MWD system 207.

MWD system 207 may also include magnetometers 211x, 211y, 211z each positioned to measure magnetic flux in the x, y, and z axis respectively. The outputs of magnetometers 211x, 211y, 211z may be used to determine the Earth's magnetic field vector relative to MWD system 207.

Additionally, MWD system 207 may include gyro sensor 213. Gyro sensor 213 may, as depicted in FIG. 2, be a microelectromechanical system (MEMS). Gyro sensor 213 may be positioned to detect angular changes in the x, y, and z axes. Although not depicted, MWD system 207 may also include a data processing system. Additionally, MWD system 207 may include a communications apparatus for communicating with sensors located elsewhere on drill string 101 and for communicating with surface 15.

As depicted in FIG. 3, an alternate MWD system 307 may include only two accelerometers 309y, 309c. In such a configuration, y-axis accelerometer 309y may be positioned to measure acceleration in the y-axis. Cant-accelerometer 309c may be positioned to measure acceleration in a direction in the x-z plane. In some embodiments, cant accelerometer 309c may measure acceleration in a direction oriented at 45° between the x and the z axis in the x-z plane. MWD system 307 may also include two single-axis gyro sensors 313x, 313z aligned to measure angular changes in the x and z axes respectively. In some such embodiments, accelerometers 309y and 309c and single-axis gyros 313x and 313z may be mounted on a gimbal platform rotatable around the z-axis of the system. When MWD system 307 is still, a compass shot may be performed by rotating the platform to multiple positions allowing, for example, removal of sensor biases as well as determination of the attitude of the tool as understood in the art. This exemplary embodiment additionally may enable mechanization of space stabilized continuous survey modes utilizing the z-axis gyro and/or y-axis accelerometer for stabilization as understood in the art. In some embodiments, a continuous reading of the attitude of MWD system 307 may be obtained with respect to the gravity vector determined by accelerometers 309y and/or 309c and with respect to true north determined by single-axis gyro 313x. Attitude, as understood in the art, refers to the orientation of MWD system 307 with respect to both gravity (inclination) and either magnetic north or true north (azimuth). Inclination refers to the vertical declination between well bore 20 and a horizontal plane. The horizontal plane may be nominally defined as a plane normal to a radius of the Earth. Azimuth, as understood in the art, may be defined as the angle of well bore 20 relative to due north as projected on the horizontal plane.

Although depicted separately, one having ordinary skill in the art with the benefit of this disclosure will understand that MWD systems 207 and 307 may of course be used in a single drill string 101 within the scope of this disclosure. Furthermore, other configurations of accelerometers, magnetometers, and gyro sensors as known in the art may be used without deviating from the scope of this disclosure. The described configurations are for reference alone and are not intended to limit the scope of this disclosure.

In some embodiments, by combining the readings from two or more sets of sensors measuring different quantities, usually when the sensors are stationary, an absolute orientation for drill string 101 can be calculated. Such an operation is known as a compass shot. For example, with reference to FIG. 2, by combining the accelerometer readings of accelerometers 209x, 209y, 209z of the Earth's gravitational field with the magnetometer readings of magnetometers 211x, 211y, 211z of the Earth's magnetic fields, a so-called magnetic azimuth may be determined. Instead, with reference to FIG. 3, by combining the accelerometer readings of accelerometers 309y, 309c of the Earth's gravitational field with the gyro readings of single-axis gyro sensors 313x, 313z of the Earth's rotation rate, a so-called geographic azimuth can be determined.

As understood in the art, the raw sensor data for each sensor is interpreted according to a sensor-specific model which takes into account certain sensor model parameters. Sensor model parameters may be pre-determined before MWD system 107 is used in a drilling operation. Consequently, the preset values may not reflect the actual operation of the sensors during the drilling operation. The sensor model parameters may be updated from time to time during the operation of the tool in which they are positioned. The determination of sensor model parameters may depend, in part, on comparing the behavior of the sensors positioned in MWD system 107 at different positions implicit to different orientations and/or sensor states during a drilling operation. Over the course of the drilling operation, invariants (such as the Earth gravity vector, magnetic flux (North), and magnetic flux (vertical) for a magnetic azimuth calculation as previously discussed) are measured, and may be reconciled to their true values by, for example, adapting the sensor model parameters in response to observed errors across multiple observations. In some embodiments, for instance, parameter updates may take the form of a weighted average combination of the measurement observations. In certain embodiments, sensor-specific models may include without limitation bias and scale factor corrections. For example, a sensor-specific model for a gyro sensor may include, but is not limited to, such specifications as: *IEEE Standard Specification Format Guide and Test Procedure for Coriolis vibratory Gyros*, IEEE Standard 1431, 2004; *IEEE Standard Specification Format Guide and Test Procedure for Single Axis Interferometric Fiber Optic Gyros*, IEEE Standard 952, 1997; *IEEE Specification Format for Single-Degree-of-Freedom Spring-Restrained Rate Gyros*, IEEE Standard 262, 1969 (Rev. 2010).

Figure 4:
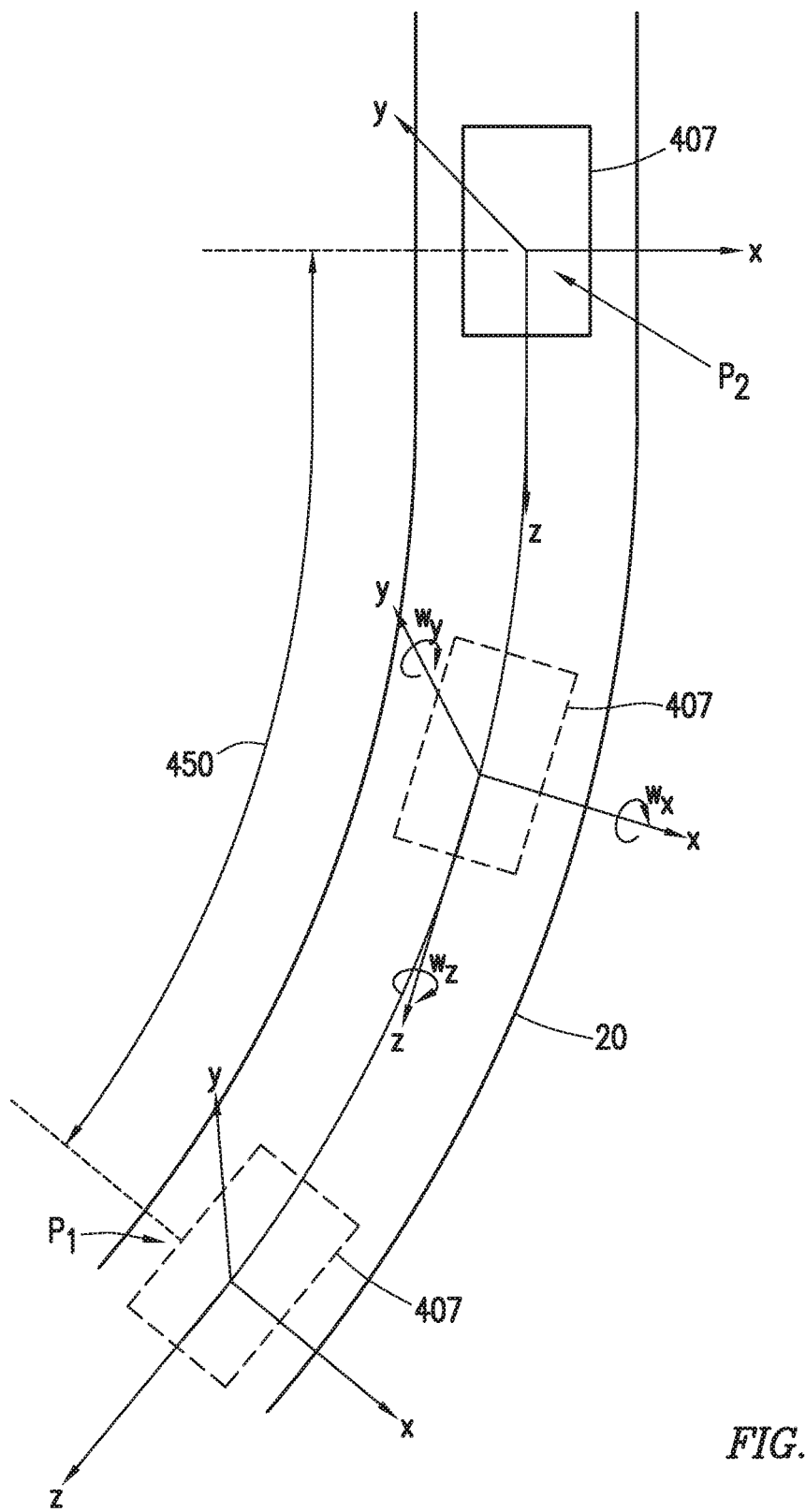
FIG. 4 depicts a survey operation of a MWD system consistent with embodiments of the present disclosure.

During drilling operations, as illustrated in FIG. 4, MWD system 407, positioned on a drill string (not shown), is moved from a first point P1 to a second point P2 in borehole 20. P1 may be either above or below P2, that is closer or further from the surface. In some embodiments, P1 and P2 may correspond to the locations of MWD system 407 when a given pipe stand is fully inserted and fully retracted from borehole 20 respectively.

Figure 5:
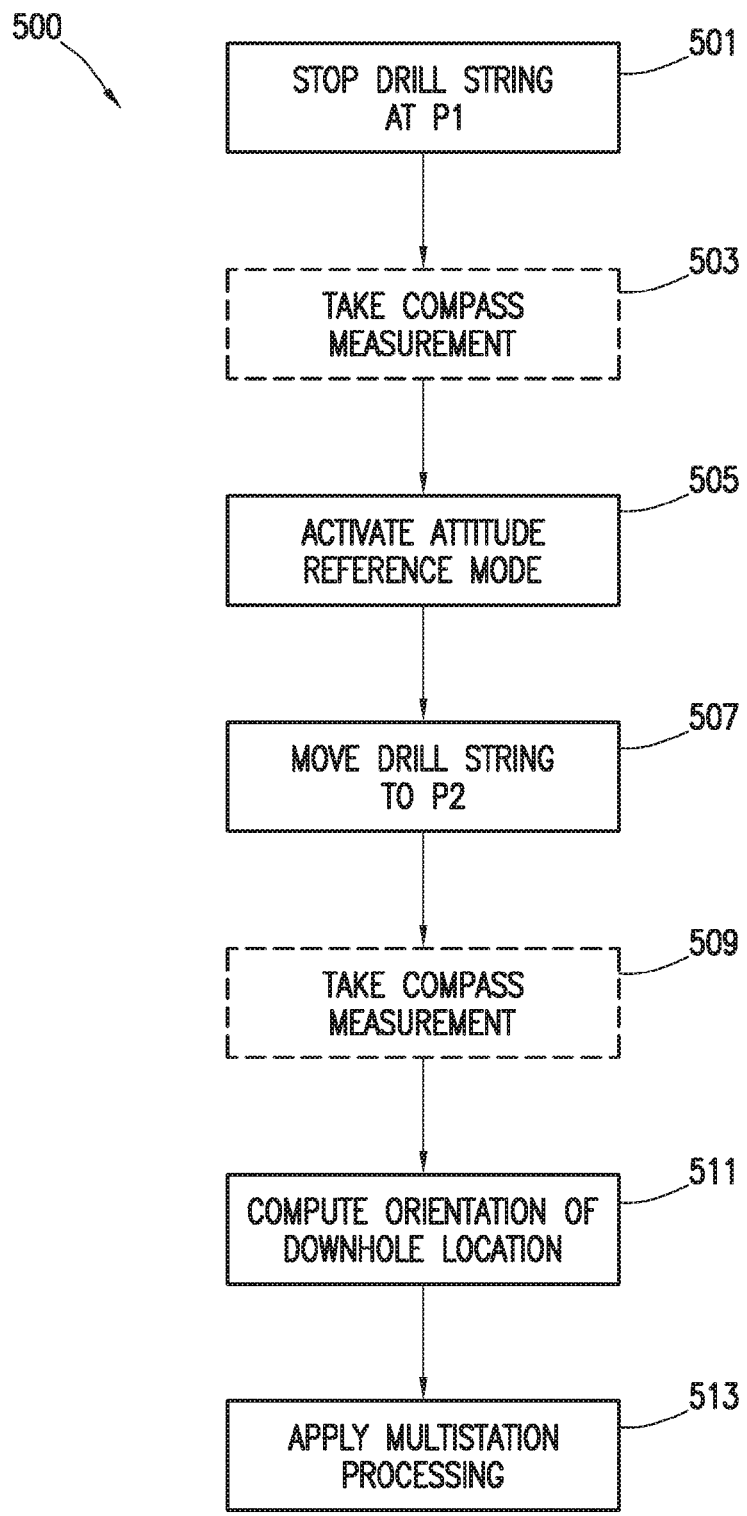
FIG. 5 depicts a flow chart of an exemplary survey operation consistent with embodiments of the present disclosure.

In an exemplary attitude reference computation procedure 500, with respect to FIGS. 4, 5, the drill string is stopped, and MWD system 407 is held stationary at position P1 (501). In some embodiments, P1 may be the position corresponding with MWD system 407 within borehole 20 at the completion of the drilling of a pipe stand. At this point, a compass shot may or may not be taken (503) using, for example, accelerometer and gyro sensors or accelerometer and magnetometers depending on the configuration of MWD system 407.

MWD system 407 is then placed into attitude reference mode (505). While in attitude reference mode, MWD system 407 is configured to make continuous attitude reference measurements. In some embodiments, the attitude reference measurements are in the form of angular deflection rates of MWD system 407 using, for example, gyro sensors. For example, as illustrated in FIG. 5, angular deflection rates as $\omega_x$, $\omega_y$, $\omega_z$ correspond to the orientation change rates output by a three-axis gyro sensor. Other configurations discussed here and otherwise may instead be used. For example, in a MWD system 407 utilizing a laser gyro, absolute orientation change may be output. One having ordinary skill in the art with the benefit of this disclosure will understand that any configuration of sensors capable of measuring orientation change rate of MWD system 407 may be utilized within the scope of this disclosure. For the sake of clarity, MWD system 407 will be discussed as utilizing a three-axis gyro sensor.

The attitude reference measurements are taken frequently enough to capture essentially all the relative orientation change taken by MWD system 407 as it moves along borehole 20. Thus the orientation change between the endpoints of a given motion within borehole 20 can be calculated effectively.

While stationary at P1, gyro sensors in certain embodiments of the MWD system 407 may be drift tuned to, for example, remove the bias outputs of the gyro sensors so that angular rates associated with the system's orientation change may be determined with better accuracy. Given that the system is still, these biases may include composites of a pure sensor bias and modeled outputs associated with, but not limited to, the rotation of the Earth in inertial space and orientation with respect to gravity. In some embodiments, these biases may also be used for, for example, the purposes of gyro quality assessment, model parameter update, and/or orientation determination. In a case where, for example, gyro sensors show little or no departure from their anticipated bias at standstill, the drift tuning operation may be omitted.

MWD system 407 may then be moved, by moving the drill string, to position P2 within borehole 20 (507). In some embodiments, P2 may be the position corresponding with MWD system 407 within borehole 20 after withdrawing the drill string the length of the last completed pipe stand. The traverse of MWD system 407 between P1 and P2 defines attitude reference interval 450. One having ordinary skill in the art with the benefit of this disclosure will understand that the relative position of P1 and P2 within borehole 20 is arbitrary as long as the depth of P1 and P2 are known. Such a determination may be relatively simple as the length of the assembled drill string is known. Thus, P1 may be closer to the surface (uphole) or farther from the surface (downhole) than P2.

While traversing attitude reference interval 450, MWD system 407 continuously measures angular deflection rates $\omega_x$, $\omega_y$, $\omega_z$. When MWD system 407 reaches P2, the drill string is stopped, and attitude reference mode is disabled. The orientation of MWD system 407 at the downhole position (P1 or P2) is then computed based on the orientation of the uphole position (P2 or P1) and the orientation change measured on attitude reference interval 450. This orientation change may be calculated, as understood in the art, as the integral of the measured angular deflection rates $\omega_x$, $\omega_y$, $\omega_z$.

In some embodiments, the orientation of MWD system 407 within borehole 20 may be known at one of P1 or P2 before MWD system 407 traverses attitude reference interval 450. For example, in an example in which P1 is the downhole position and corresponds with the position of MWD system 407 at the completion of drilling a drill stand, and P2 corresponds with the position of MWD system 407 at the beginning of drilling the drill stand (alternatively characterized as the completion of the previous drill stand), the orientation at P2 may be known. The orientation at P2 may have been determined by a compass measurement already taken at this location or may have been calculated as part of a previous attitude reference computation procedure 500. In other embodiments, a compass measurement may be taken once MWD system 407 reaches P2 (509).

Generally speaking, since the orientation at the downhole location is the unknown, and the orientation at the uphole location is known from previous iterations, a compass shot may be taken at only the downhole location. Depending on whether MWD system 407 moves from an uphole P1 to a downhole P2 (a "pushdown interval") or a downhole P1 to an uphole P2 (a "pullback interval"), only one compass shot (503 or 509) is taken. In other embodiments, orientation of MWD system 407 is calculated only by measurements made during repeated attitude reference intervals 450, and compass shots are taken at neither P1 nor P2, though the orientation at the uphole location is known from the previous iterations.

The ultimate reference orientation computed by attitude reference computation procedure 500 for the downhole unknown position is thus calculated as a weighted average of the measured orientation change between P1 and P2 and any compass shots. For example, where a compass shot is taken only at the uphole location, the orientation at the downhole location may be computed as the vector sum of the orientation determined by the compass shot and the integral of the angular deflection rates $\omega_x$, $\omega_y$, $\omega_z$ measured during attitude reference computation procedure 500.

In fact, in some embodiments, a single compass shot alone may be used for an entire drilling operation. The compass shot may be made near the surface. The orientation of MWD system 407 as borehole 20 is drilled is calculated by repeating attitude reference computation procedure 500 for each pipe stand used during the drilling operation. Thus, the orientation of MWD system 407 is determined as the summation of the orientation changes between the beginning and completion of each pipe stand, each orientation change calculated by a separate attitude reference computation procedure 500.

In some embodiments, neither P1 nor P2 of a given attitude reference computation procedure 500 may correspond to a location having a known orientation. For example, multiple iterations of attitude reference computation procedure 500 may exist between the position of MWD system 407 at the completion and at the beginning of a single pipe stand. In such an embodiment, attitude reference interval 450 measurements are repeated and summed until a P2 with known orientation is reached—i.e. at a position corresponding to the beginning of the pipe stand—and the orientation of MWD system 407 at the farthest downhole location of the series of attitude reference intervals 450 is calculated as the sum of the orientation intervals leading to the known P2.

In some embodiments, given a compass measurement (503 or 509) at P1, P2, or both P1 and P2, multistation processing may be applied to better determine sensor model parameters (513). Such multistation processing may use data obtained by measurements through attitude reference computation procedure 500 and, for example, data from a previous attitude reference computation procedure or data from other sensors.

For example, tieback processing could be applied to adapt sensor model parameters for gyro sensors in a MWD system. Because compass shots made using gyro sensors naturally tends to decrease in accuracy at higher borehole inclinations, adaptations in the sensor model parameters to account for this degradation may increase accuracy of subsequent compass shots using the gyro sensor. In such a case, the azimuth calculated by the gyro sensor model may be used to correct a compass measurement to match the azimuth as determined by the attitude reference computation procedure, i.e. by applying a calculated azimuth offset. Alternatively, the mass unbalance terms of the gyro sensor model may be shifted to correct the measured azimuth. In some cases, a combination of the two approaches may be used simultaneously. For subsequent compass shots, the calculated offsets, such as the azimuth offset, may be applied to, for example, increase the accuracy of the compass shot whether or not a subsequent attitude reference computation procedure is carried out. In some embodiments, data from more than one attitude reference computation procedure 500 may be combined to, for example, improve the accuracy of sensor model parameter estimations. In some embodiments, comparison of the model parameters calculated from different individual or sets of attitude reference data may be used to detect sensor damage.

Similarly, tieback processing may be applied to the measurements made by magnetometers in a MWD system. Magnetic interference downhole, caused, for example, by the natural or artificial presence of ferromagnetic materials in the formation surrounding the borehole and, indeed, by the drill string itself, may cause inaccuracy with the proper detection of the Earth magnetic field. By comparing the azimuth as determined by a compass shot using the magnetometer with the azimuth as determined by the attitude reference computation procedure, the on- and off-drillstring interference may be separated from the detected Earth magnetic field. Alternatively, one or more compass shots and/or sections of attitude reference mode data from the gyro sensors may be compared simultaneously to one or more magnetic compass shots to separate the on- and off-drillstring interference from the detected Earth magnetic field. Thus, interference can be taken into account in the magnetometer sensor model. Alternatively, in some embodiments, only on-drillstring interference may be separated from the detected magnetic field, allowing for ranging with proximate wellbores while drilling using the magnetometer.

Similarly, tieback processing may be applied sensor model parameters of accelerometers in a MWD system including calculation of an acceleration offset analogous to the azimuth offset calculated with regard to the gyro.

In some embodiments, one or more magnetic compass shots may be compared to one or more gyro sensor compass shots and/or sections of attitude reference mode data to correct parameters of the gyro sensor model. In this case, both magnetic compass shots known to be free of on- and off-drillstring interference and magnetic compass shots corrected using previously determined adjustments to the magnetometer sensor model may be used to correct gyro sensor model parameters.

Figure 6:
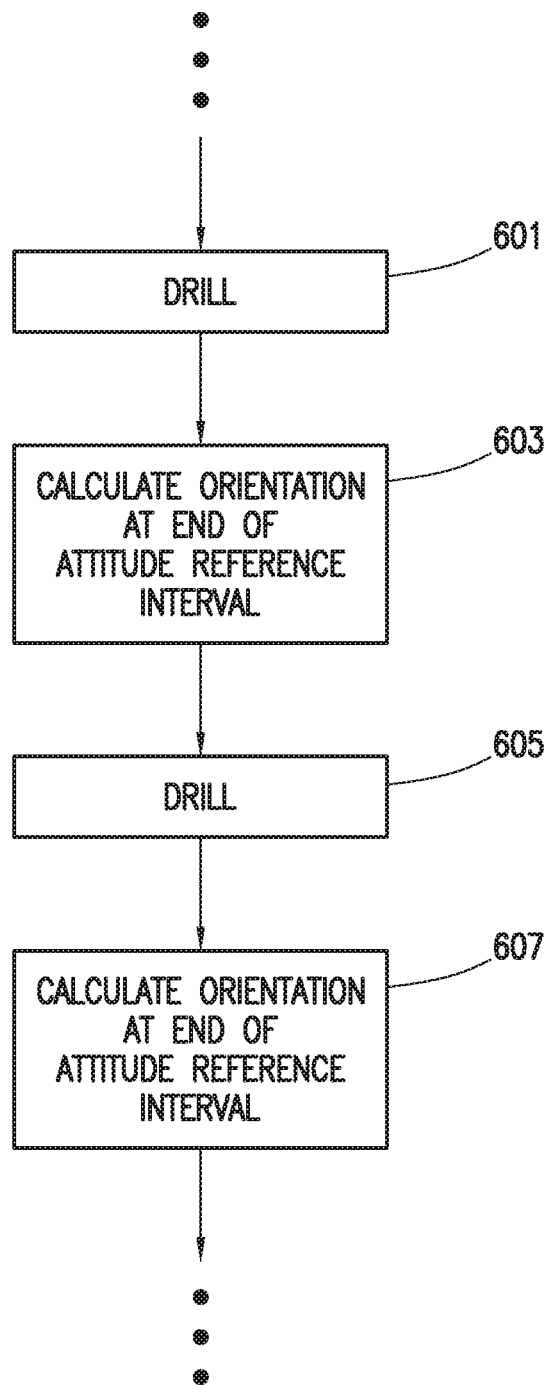
FIG. 6 depicts a flow chart of an exemplary iterative survey operation consistent with embodiments of the present disclosure.

In some embodiments, overlap processing may be used to address other sources of inaccuracy. For example, as depicted in FIG. 6, two attitude reference computation procedures 603, 607 are carried out with a drilling operation 605 separating them. The measured orientation of the endpoint of the first attitude reference computation procedure 603 may be compared with that of the start of the second attitude reference computation procedure 607. Since, in theory, both of these positions should be the same, any inaccuracies (including, for example center offset) may be detected and accounted for in the sensor models. In some embodiments, the difference in orientation between the measured (or computed) orientation of the endpoint of the first attitude reference computation procedure 603 with the measured (or estimated) orientation at the start of the second attitude reference computation procedure 607 may define an offset error. In some embodiments, the matching at the interval boundary may be weighted according to, for example, estimates of center offset error against the best estimate of orientation accuracy that could be made otherwise.

One having ordinary skill in the art with the benefit of this disclosure will understand that the attitude reference computation procedures 603, 607 need not be separated by a drilling procedure, and that drilling procedure 605 is included simply to illustrate the separation of the attitude reference computation procedures 603, 607. In other embodiments, multiple attitude reference computation procedures may be carried out across the length of a single pipe stand. In fact, although vibrations associated with drilling procedures may introduce noise into computation, in some embodiments, attitude reference computation procedures 603, 607 may be carried out during drilling procedures 601, 605. Thus orientation changes may be continuously sampled during the drilling of the full length of a pipe stand.

Furthermore, one having ordinary skill in the art with the benefit of this disclosure will understand that more than one of the previously described processes may be utilized during the course of drilling a single well. By using both tieback and overlap processing, additional accuracy may be achieved. The weighting of the two processing methods may be determined by a predetermined error model taking into account the respective accuracies of the two.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
providing a MWD system, the MWD system including multiple sensors, wherein at least one of the multiple sensors is a gyro sensor, wherein the data collected by the sensors is interpreted by sensor models having adjustable sensor model parameters, wherein the sensor model parameters of the sensor model for the gyro sensor comprise azimuth offset and mass unbalance terms, and wherein the MWD system has an orientation, the orientation including azimuth and inclination;
positioning the MWD system on a drill string;
positioning the drill string at a depth within a borehole drilled from a surface location, the depth measured from the location of the MWD system to the surface location, the direction of the borehole at the location of the MWD system generally being represented by the orientation of the MWD system;
moving, by a motion of the drill string, the location of the MWD system within the borehole from a first depth to a second depth;
sensing changes in the orientation of the MWD system using one or more sensors of the multiple sensors as the MWD system is moved from the first depth to the second depth; and
calculating the change in orientation of the MWD system between the first and second depths using the sensed changes in the orientation of the MWD system as the MWD system is moved.

2. The method of claim 1, further comprising:
taking a compass shot using two or more sensors of the multiple sensors at the first depth to determine an estimated orientation of the MWD system at the first depth; and
computing a computed orientation of the MWD system at the second depth using the calculated change in orientation between the first and second depths and estimated orientation of the MWD system at the first depth.

3. The method of claim 2, further comprising:
moving, by a motion of the drill string, the MWD system from the second depth to a third depth;
sensing changes in the orientation of the MWD system using one or more sensors of the multiple sensors as the MWD system is moved from the second depth to the third depth;
calculating the change in orientation of the MWD system between the second and third depths using the sensed changes in the orientation of the MWD system as the MWD system is moved from the second depth to the third depth; and
computing a computed orientation of the MWD system at the third depth using the calculated change in orientation between the second and third depths and the computed orientation of the MWD system at the second depth.

4. The method of claim 1, further comprising:
taking a compass shot using two or more sensors of the multiple sensors at the first depth to determine an estimated orientation of the MWD system at the first depth;
taking a compass shot using two or more sensors of the multiple sensors at the second depth to determine an estimated orientation of the MWD system at the second depth;
computing a computed orientation of the MWD system at the second depth using the calculated change in orientation between the first and second depths and estimated orientation of the MWD system at the first depth;
comparing the computed orientation of the MWD system at the second depth to the estimated orientation of the MWD system at the second depth so as to calculate an offset error; and
adjusting one or more of the adjustable sensor model parameters of one or more sensors of the multiple sensors in response to the offset error.

5. The method of claim 4, further comprising:
drilling to a third depth using the drilling string; and
guiding the drill string during the drilling operation using the at least one adjusted sensor model parameter.

6. The method of claim 1, further comprising:
holding the MWD system still; and
drift tuning the gyro sensor to detect and remove bias outputs of the gyro sensor.

7. The method of claim 6, wherein the detected bias may be used for at least one of quality assessment, model parameter update, or orientation determination.

8. The method of claim 1, wherein at least one sensor of the multiple sensors is a magnetometer, and the sensor model parameters of the sensor model for the magnetometer comprise at least one of natural or artificial magnetic anomalies affecting the magnetometer.

9. The method of claim 8, wherein at least one artificial magnetic anomaly comprises a second borehole, and a range between the MWD system and the second borehole is calculated using data collected by the magnetometer along the borehole.

10. The method of claim 1, wherein at least one sensor of the multiple sensors is an accelerometer, and the sensor model parameters of the sensor model for the accelerometer comprise an acceleration offset.

11. The method of claim 1, further comprising:
taking a compass shot using two or more sensors of the multiple sensors at the second depth to determine an estimated orientation of the MWD system at the second depth; and
computing a computed orientation of the MWD system at the first depth using the calculated change in orientation between the first and second depths and estimated orientation of the MWD system at the second depth.

12. The method of claim 11, further comprising:
moving, by a motion of the drill string, the MWD system from a third depth to the second depth;
sensing changes in the orientation of the MWD system using one or more sensors of the multiple sensors as the MWD system is moved from the third depth to the second depth; and
calculating the change in orientation of the MWD system between the third and second depths using the sensed changes in the orientation of the MWD system as the MWD system is moved from the third depth to the second depth; and computing a computed orientation of the MWD system at the third depth using the calculated change in orientation between the third and second depths and the computed orientation of the MWD system at the second depth.

13. The method of claim 12, further comprising:

taking a compass shot using two or more sensors of the multiple sensors at the third depth to determine an estimated orientation of the MWD system at the third depth;

computing a second computed orientation of the MWD system at the second depth using the calculated change in orientation between the third and second depths and the estimated orientation of the MWD system at the third depth;

comparing the first computed orientation of the MWD system at the second depth to the second computed orientation of the MWD system at the second depth to calculate an offset error; and adjusting one or more sensor model parameters of one or more sensors of the multiple sensors in response to the offset error.

14. The method of claim 13, further comprising:

drilling to a fourth depth using the drilling string; and guiding the drill string during the drilling operation using the at least one adjusted sensor model parameter.

15. The method of claim 1, further comprising moving, by a motion of the drill string, the MWD system from a third depth to a proximate depth, the proximate depth defined as the closer of the first and second depths to the third depth;

sensing changes in the orientation of the MWD system using one or more sensors of the multiple sensors as the MWD system is moved from the third depth to the proximate depth; and calculating the change in orientation of the MWD system between the third and proximate depths using the sensed changes in the orientation of the MWD system as the MWD system is moved from the third depth to the proximate depth.

16. The method of claim 15, wherein the orientation at the proximate location is known; and computing a computed orientation of the MWD system at the third depth using the calculated change in orientation of the MWD system between the third and first depths and the known orientation of the MWD system at the first depth.

17. The method of claim 1, further comprising:

taking a compass shot using two or more sensors of the multiple sensors at the first depth to determine an estimated orientation of the MWD system at the first depth;

taking a compass shot using two or more sensors of the multiple sensors at the second depth to determine an estimated orientation of the MWD system at the second depth;

computing a computed orientation of the MWD system at the second depth using the calculated change in orientation and the estimated orientation of the MWD system at the first depth;

comparing the estimated and computed orientations of the MWD system at the second depth so as to calculate an offset error;

computing a computed orientation of the MWD system at the first depth using the offset error and the estimated orientation of the MWD system at the first depth; and adjusting one or more sensor model parameters of one or more sensors of the multiple sensors in response to the offset error.

18. The method of claim 17, further comprising:

drilling to a third depth using the drilling string; and guiding the drill string during the drilling operation using the at least one adjusted sensor model parameter.

19. The method of claim 1, further comprising:

taking a compass shot using two or more sensors of the multiple sensors between the first depth and the second depth to determine an estimated transition orientation.

20. The method of claim 1, wherein the moving operation further comprises drilling into an earthen formation.

21. A method comprising:

providing a MWD system, the MWD system including multiple sensors, wherein at least one of the multiple sensors is a gyro sensor, wherein the data collected by the sensors is interpreted by sensor models having adjustable sensor model parameters, wherein the sensor model parameters of the sensor model for the gyro sensor comprise azimuth offset and mass unbalance terms, and wherein the MWD system has an orientation, the orientation including azimuth and inclination;

positioning the MWD system on a drill string;

positioning the drill string at an upper depth within a borehole drilled from a surface location into an earthen formation, the depth measured from the location of the MWD system to the surface location, the direction of the borehole at the location of the MWD system generally being represented by the orientation of the MWD system;

taking a compass shot using two or more sensors of the multiple sensors at the upper depth to determine the orientation of the MWD system at the upper depth;

drilling deeper into the earthen formation, and optionally moving the MWD system to a lower depth;

moving, by a motion of the drill string, the MWD system within the borehole either from the upper depth to the lower depth or from the lower depth to the upper depth;

sensing changes in the orientation of the MWD system using one or more sensors of the multiple sensors as the MWD system is moved;

calculating the change in orientation of the MWD system between the upper and lower depths using the sensed changes in the orientation of the MWD system as the MWD system is moved;

computing the orientation of the MWD system at the lower depth using the calculated change in orientation between the upper and lower depths and the orientation of the MWD system at the upper depth;

comparing the computed orientation of the MWD system at the lower depth to the estimated orientation of the MWD system at the lower depth so as to calculate an offset error; and adjusting one or more of the adjustable sensor model parameters of the gyro sensor of the multiple sensors in response to the offset error.

22. The method of claim 21, wherein the moving, sensing, and calculating operations are repeated for one or more subsequent drilling operations, wherein the lower depth of a given iteration corresponds with the upper depth of a subsequent iteration, and the orientation of the MWD system at the lower depth of the given iteration corresponds with the orientation of the MWD system at the upper depth for the subsequent iteration.

23. A method comprising:
providing a MWD system, the MWD system including multiple sensors, wherein at least one of the multiple sensors is a gyro sensor, wherein the data collected by the sensors is interpreted by sensor models having adjustable sensor model parameters, wherein the adjustable sensor model parameters of the sensor model for the gyro sensor comprise at least one of azimuth offset and mass unbalance terms, and wherein the MWD system has an orientation, the orientation including azimuth and inclination;
positioning the MWD system on a drill string;
positioning the drill string at a depth within a borehole drilled from a surface location, the depth measured from the location of the MWD system to the surface location, the direction of the borehole at the locations of the MWD system generally being represented by the orientation of the MWD system;
moving, by a motion of the drill string, the location of the MWD system within the borehole from a first depth to a second depth;
sensing changes in the orientation of the MWD system using one or more sensors of the multiple sensors as the MWD system is moved from the first depth to the second depth; and
calculating the change in orientation of the MWD system between the first and second depths using the sensed changes in the orientation of the MWD system as the MWD system is moved;
taking a compass shot using two or more sensors of the multiple sensors at each of the first and second depths to determine an estimated orientation of the MWD system at each of the first and second depths; and
computing a first computed orientation of the MWD system at one of the first or second depths using the estimated orientation of the MWD system at the other of the first or second depths and the calculated change in orientation between the first and second depths;
calculating an offset error based on a comparison of the computed and estimated orientations for said one of the first or second depths; and
adjusting one or more of the adjustable sensor model parameters of one or more sensors of the multiple sensors in response to the calculated offset error.

24. The method of claim 23 wherein the first computed orientation is computed at the second depth using the calculated change in orientation between the first and second depths and estimated orientation of the MWD system at the first depth, further including the steps of:
moving, by a motion of the drill string, the MWD system to a third depth;
moving, by a motion of the drill string, the MWD system from the third depth to the second depth;
sensing changes in the orientation of the MWD system using one or more sensors of the multiple sensors as the MWD system is moved from the third depth to the second depth; and
calculating the change in orientation of the MWD system between the third and second depths using the sensed changes in the orientation of the MWD system as the MWD system is moved from the third depth to the second depth; and
taking a compass shot using two or more sensors of the multiple sensors at the third depth to determine an estimated orientation of the MWD system at the third depth;
computing a second computed orientation of the MWD system at the second depth using the calculated change in orientation between the third and second depths and the estimated orientation of the MWD system at the third depth;
comparing the first computed orientation of the MWD system at the second depth to the second computed orientation of the MWD system at the second depth to calculate an offset error.

25. The method of claim 23 wherein one of the adjusted sensor model parameters is the azimuth offset or the mass unbalance terms.

26. The method of claim 25 wherein at least one sensor of the multiple sensors is an accelerometer and the sensor model parameters of the sensor model for the accelerometer comprise an acceleration offset.

* * * * *